US009221205B2

(12) United States Patent
Desmazieres et al.

(10) Patent No.: US 9,221,205 B2
(45) Date of Patent: Dec. 29, 2015

(54) MOLD AND METHOD FOR INJECTION-MOLDING A PART WITH A PROJECTING PORTION

(75) Inventors: Michel Desmazieres, Couddes (FR); François Gosselin, Angers (FR)

(73) Assignee: Valeo Vision, Bobigny (FR)

(*) Notice: Subject to any disclaimer, the term of this patent is extended or adjusted under 35 U.S.C. 154(b) by 531 days.

(21) Appl. No.: 13/472,633

(22) Filed: May 16, 2012

(65) Prior Publication Data

US 2012/0326354 A1    Dec. 27, 2012

(30) Foreign Application Priority Data

May 17, 2011    (FR) .................................... 11 54256

(51) Int. Cl.
B29C 45/56    (2006.01)
B28B 7/30    (2006.01)
B22D 17/22    (2006.01)
B29C 45/00    (2006.01)
B29L 31/00    (2006.01)

(52) U.S. Cl.
CPC ............... B29C 45/56 (2013.01); B22D 17/22 (2013.01); B29C 45/0025 (2013.01); B29C 45/561 (2013.01); B29C 2045/563 (2013.01); B29L 2031/747 (2013.01)

(58) Field of Classification Search
CPC  B29C 45/56; B29C 2045/563; B29C 45/561; B29C 45/0025; B22D 17/22; B29L 2031/747
See application file for complete search history.

(56) References Cited

U.S. PATENT DOCUMENTS

| 4,489,033 | A | * | 12/1984 | Uda et al. .................... 264/328.7 |
| 6,010,656 | A | * | 1/2000 | Nomura et al. ............... 264/255 |
| 7,235,918 | B2 | | 6/2007 | McCullough et al. |
| 7,237,933 | B2 | | 7/2007 | Radu et al. |
| 2002/0145882 | A1 | * | 10/2002 | Shimakura .................... 362/518 |
| 2004/0101586 | A1 | * | 5/2004 | Kamiya et al. ................ 425/122 |
| 2004/0251804 | A1 | | 12/2004 | McCullough et al. |
| 2005/0110380 | A1 | | 5/2005 | McCullough et al. |
| 2006/0061138 | A1 | | 3/2006 | Radu et al. |
| 2007/0104955 | A1 | * | 5/2007 | Hoogland ................. 428/411.1 |
| 2011/0187023 | A1 | * | 8/2011 | De Jonge ................... 264/328.7 |
| 2012/0261845 | A1 | * | 10/2012 | Hara et al. ..................... 264/1.1 |

FOREIGN PATENT DOCUMENTS

| GB | 2418170 | 3/2006 |
| JP | 08323820 | 12/1996 |
| JP | 09076301 | 3/1997 |
| JP | 10071632 | 3/1998 |
| JP | 2004216724 | 8/2004 |
| JP | 2009023249 | 2/2009 |

* cited by examiner

Primary Examiner — Yogendra Gupta
Assistant Examiner — Emmanuel S Luk
(74) Attorney, Agent, or Firm — Jacox, Meckstroth & Jenkins

(57) ABSTRACT

A mold and a method for the molding by injection of plastic material of a generally thin part, notably of a vehicle lighting and/or signalling device. The mold comprises two half-molds designed to be disposed one against the other and forming an enclosure designed to be filled with plastic material by injection. The plastic material is injected via an injection nozzle in the vicinity of one end of the part. The volume formed by the mold includes a cavity the volume of which may be modulated by means of a mobile element. During the injection of plastic material, when the latter has reached at least the level of the cavity, the initially zero volume of the cavity is progressively increased via the control means of the mobile element.

18 Claims, 4 Drawing Sheets

Prior Art

MOLD AND METHOD FOR INJECTION-MOLDING A PART WITH A PROJECTING PORTION

CROSS-REFERENCE TO RELATED APPLICATIONS

This application claims priority to French Application No. 1154256 filed May 17, 2011, which application is incorporated herein by reference and made a part hereof.

BACKGROUND OF THE INVENTION

1. Field of the Invention

The invention relates to a mold element for injection molding plastic material parts. The invention also relates to a mold including the mold element. The invention further relates to a method of injection molding a plastic material part and a part produced by the method, notably a part for a lighting and/or signalling device.

2. Description of the Related Art

The fabrication of plastic parts by injection molding is well known in itself and routinely practiced. Injection molding, also known as plastic injection, is a method of using thermoplastics. Most thermoplastic parts are fabricated with plastic injection presses: the plastic material is softened and then injected into a mold, and then cooled. Injection molding is a fabrication technique for mass producing parts. It concerns above all plastic materials and elastomers (rubbers), but also diverse metals and alloys with a relatively low melting point: alloys of aluminum, zinc (Zamak), brass or alloys of magnesium in particular transformed by a thixomolding method.

FIG. 1 is a sectional view of a known mold 2. It essentially comprises two half-molds 4 and 6 disposed one against the other and forming a volume 8 designed to be filled with plastic material to form the part. The half-mold 6 includes an injection nozzle 10 fed with plastic material via the passage 12 and actuated by a driving device 14.

The area where the plastic material enters the volume 8 formed by the mold 2 is shown in more detail in the lower portion of the figure corresponding to an enlargement of the encircled portion of the mold 2. The injection nozzle 10 feeds the volume 8 at a low point so that the plastic material first fills the lower portion of the part and then fills the upper portion. The plastic material 18 is represented by a darker area in the FIG. 1 enlargement. The volume 8 includes a cavity 16 for forming a projection from the rest of the part to be formed. During injection of the plastic material, the latter material will partially fill the cavity 16 without filling it completely because of the accumulation of air in the far end of the cavity. The incomplete filling of the cavity is clearly visible in FIG. 1.

FIG. 2 shows in more detail the phenomenon of formation of a defect at the level of the cavity 16 of the volume 8 from FIG. 1. The plastic material 18 flowing into the volume partially fills the latter, the upper level being illustrated by a surface rounded in the manner of convex meniscus. The incomplete formation of the projecting portion 20 of the part may be seen. This portion 20 has a clearance angle greater than or equal to 1° relative to the internal surface of the cavity 16. The end face 22 of the projecting portion 20 moreover has a surface that is not plane and not regular. When the plastic material 18 flowed into the cavity, air escaped and was drawn downstream. As a function of diverse rheological parameters, notably the viscosity of the plastic material and the speed of the flow, some of this air may remain trapped in an area 23 disposed downstream of the entry of the cavity 16. As a function of diverse rheological parameters, when it passes in front of the cavity, the flow may also be disrupted by sudden changes of thickness, also generating diverse defects in the part. The result of these phenomena is defects of different types in the finished part.

What is needed, therefore, is a system and method that overcomes one or more of the aforementioned problems.

SUMMARY OF THE INVENTION

The objective of the present invention is to propose a solution to at least one of the problems referred to above. More specifically, an objective of the invention is to propose a mold for the fabrication by injection of parts having at least one projecting portion such as a stud and a molding method for the fabrication of such parts that reduces or even eliminates the defects referred to above.

The invention comprises a mold element for molding parts by injection of plastic material, comprising a surface designed to receive the plastic material and to form the part, the surface including a cavity adapted to form a projecting portion of the part, noteworthy in that the mold element includes an element mobile in translation in the cavity, the mobile element being adapted to modulate the volume of the cavity during the molding of the part.

In an advantageous embodiment of the invention, the mobile element is configured so that it may be disposed with its exterior surface at the level of the opening of the cavity.

In another advantageous embodiment of the invention, the cavity is of generally elongate or even rectilinear shape in a longitudinal direction, and possibly in any transverse direction, the mobile element being mobile in the longitudinal direction and preferably occupying a greater part, preferably at least 80%, more preferably at least 90% of the section of the cavity.

In another advantageous embodiment of the invention, the mobile element is mobile in translation via a driving device. In one embodiment, the driving device is adapted to move the mobile element into the cavity from the opening of the cavity. The driving device may be of the hydraulic type. The driving device may of course be of another kind, such as pneumatic, electrical, etc., well known in itself to the person skilled in the art.

It is thus possible to control precisely the modulation of the cavity volume when molding the part. It is notably possible to impart to the projecting portion of the part a repeatable shape, such as a reference shape, for example.

The invention also comprises a mold for molding a part by injection of plastic material, including at least two mold elements designed to cooperate with each other to form an enclosure corresponding to the shape of the part to be formed and designed to receive the plastic material in a main flow direction, characterized in that at least one of the mold elements conforms to the invention.

In an advantageous embodiment of the invention, the cavity is disposed generally transverse to the main direction of flow of the plastic material during fabrication of the part by injection. The cavity has a longitudinal axis forming with the main flow direction at the level of the cavity an angle preferably in the range 30° to 90°, more preferably in the range 45° to 90°. When the angle in question is less than 90°, the cavity may be oriented in the direction of the flow or in the opposite direction.

According to another advantageous embodiment of the invention the part has a generally thin shape, preferably having a substantially layer shape, the portion formed by the cavity projecting from the thin part, notably from a main face of the part.

In another advantageous embodiment of the invention, the mold includes a passage for feeding the plastic material into the molding cavity, the cavity being disposed downstream of the passage in the direction of flow of the plastic material during molding.

The invention also comprises a method for molding a part by plastic injection, comprising the following steps: a) making available a mold forming an enclosure corresponding the shape of the part to be formed, the enclosure including a cavity designed to form a projecting portion of the part; b) injection of plastic material into the enclosure of the mold, which method is noteworthy for the following additional step: c) modulation of the volume of the cavity in the direction of an increase in the volume during the step b).

In another advantageous embodiment of the invention, the modulation in the step c) consists in increasing the volume of the cavity when the level of the plastic material has reached the inlet of the cavity.

In another advantageous embodiment of the invention, the modulation in the step c) takes place when the plastic material present in and/or in front of the inlet of the cavity has not yet solidified. An advantage of this feature is that the molded part is free of cracks, notably at the level of the projecting portion of the part. It is consequently possible to use plastic materials sensitive to cracking under stress, such as polycarbonate or PMMA, for example.

In another advantageous embodiment of the invention, the modulation of the step c) starts from a volume of the cavity less than 20%, preferably 10%, more preferably 5% of the final volume of the cavity. The whole of the final volume of the cavity is preferably filled at the start of the step c).

In another advantageous embodiment of the invention, the mold conforms to the invention or includes a mold element of the invention.

In another advantageous embodiment of the invention, the molded part is a vehicle lighting and/or signalling device element and the projecting portion formed by the cavity is for example a stud. It may be a fixing stud of another element of the lighting and/or signalling device.

In another advantageous embodiment of the invention, the projecting portion of the part has a volume less than or equal to 15%, preferably 10%, more preferably 5% of the total volume of the part.

In another advantageous embodiment of the invention, the method includes an additional step d) consisting in the modulation of the volume of the cavity in the direction of reducing the volume after the step c).

In an advantageous embodiment of the invention, the modulation in the step d) consists in reducing the volume of the cavity when the plastic material level has reached a predetermined size, notably a reference size.

In a further advantageous feature of the invention, the modulation in the step d) reaches a cavity volume greater than 85%, preferably 90%, more preferably 95% of the final volume of the cavity.

This additional step d) enables the shape of the projecting portion to be guaranteed and notably enables the presence of shrinkage holes in this projecting portion to be avoided.

The invention further consists in an element, notably a vehicle lighting and/or signalling device element, including a projecting portion, characterized in that it is produced by the method according to the invention and the end of the projecting portion has an edge formed by the step c).

In an advantageous embodiment of the invention, the projecting portion has a residual stress less than 10 MPa. This characteristic could be measured by the drilling method, for example.

The aforementioned features of the invention, by modulating the volume of the cavity, enable progressive penetration of the injected material, which is thus able to advance progressively all across its front into the cavity as its volume increases. The part to be formed is generally thin, preferably forming a plate. The cavity preferably has a mean section and/or an inlet section less than or equal to the smallest section of the part in the cavity.

These and other objects and advantages of the invention will be apparent from the following description, the accompanying drawings and the appended claims.

BRIEF DESCRIPTION OF THE ACCOMPANYING DRAWINGS

Other features and advantages of the present invention will be better understood with the assistance of the description and the drawings, in which.

DETAILED DESCRIPTION OF THE PREFERRED EMBODIMENTS

Figure 1:
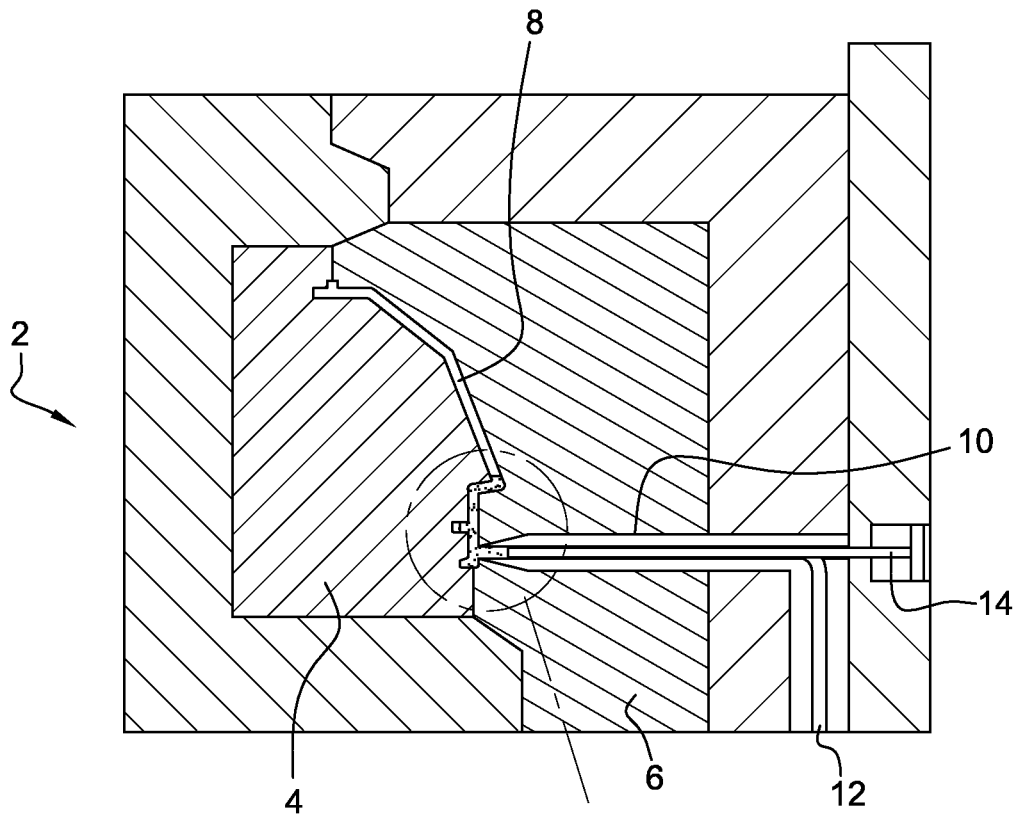
FIG. 1 is a sectional view of a prior art mold for parts, generally thin parts with at least one projecting stud.
Figure 1:
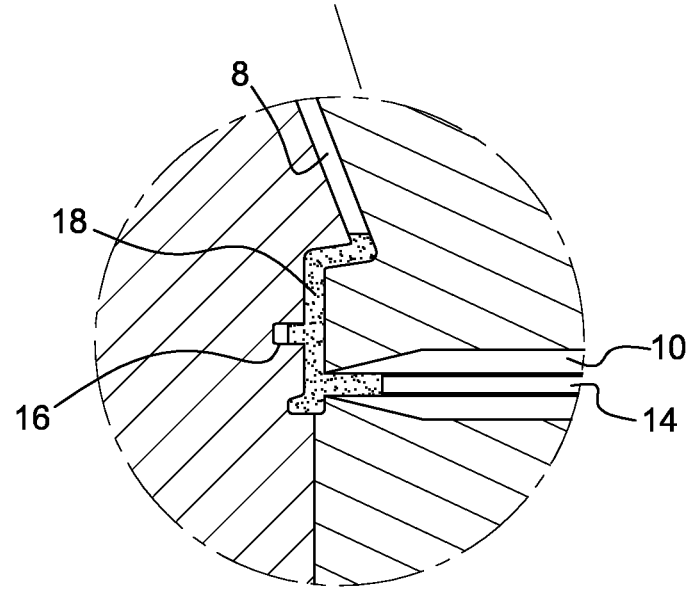
Figure 2:
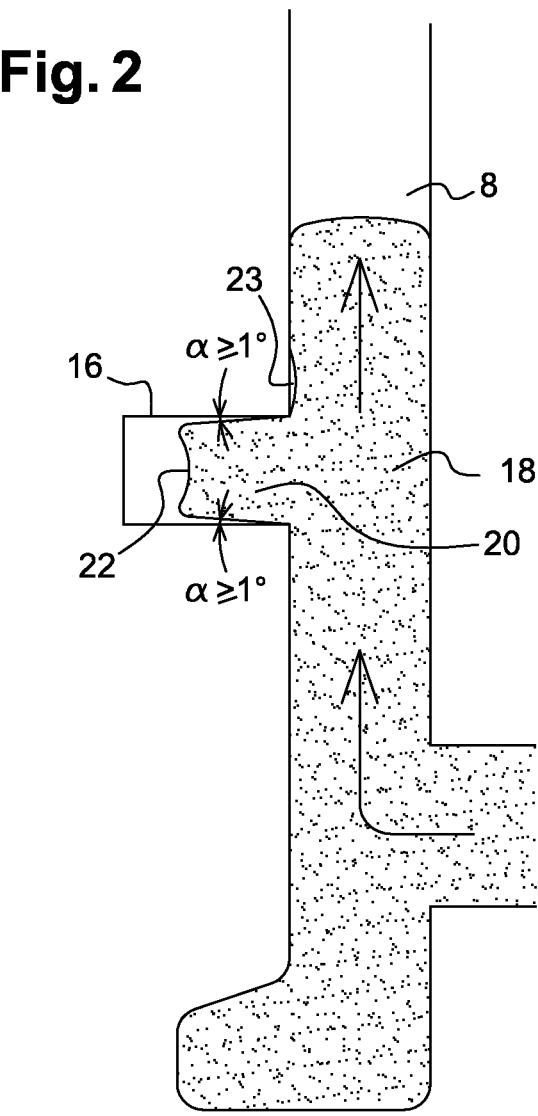
FIG. 2 is a view to a larger scale of the critical portion of the volume of the mold from FIG. 1, showing various defects that may be produced when fabricating the part by plastic injection.
Figure 3:
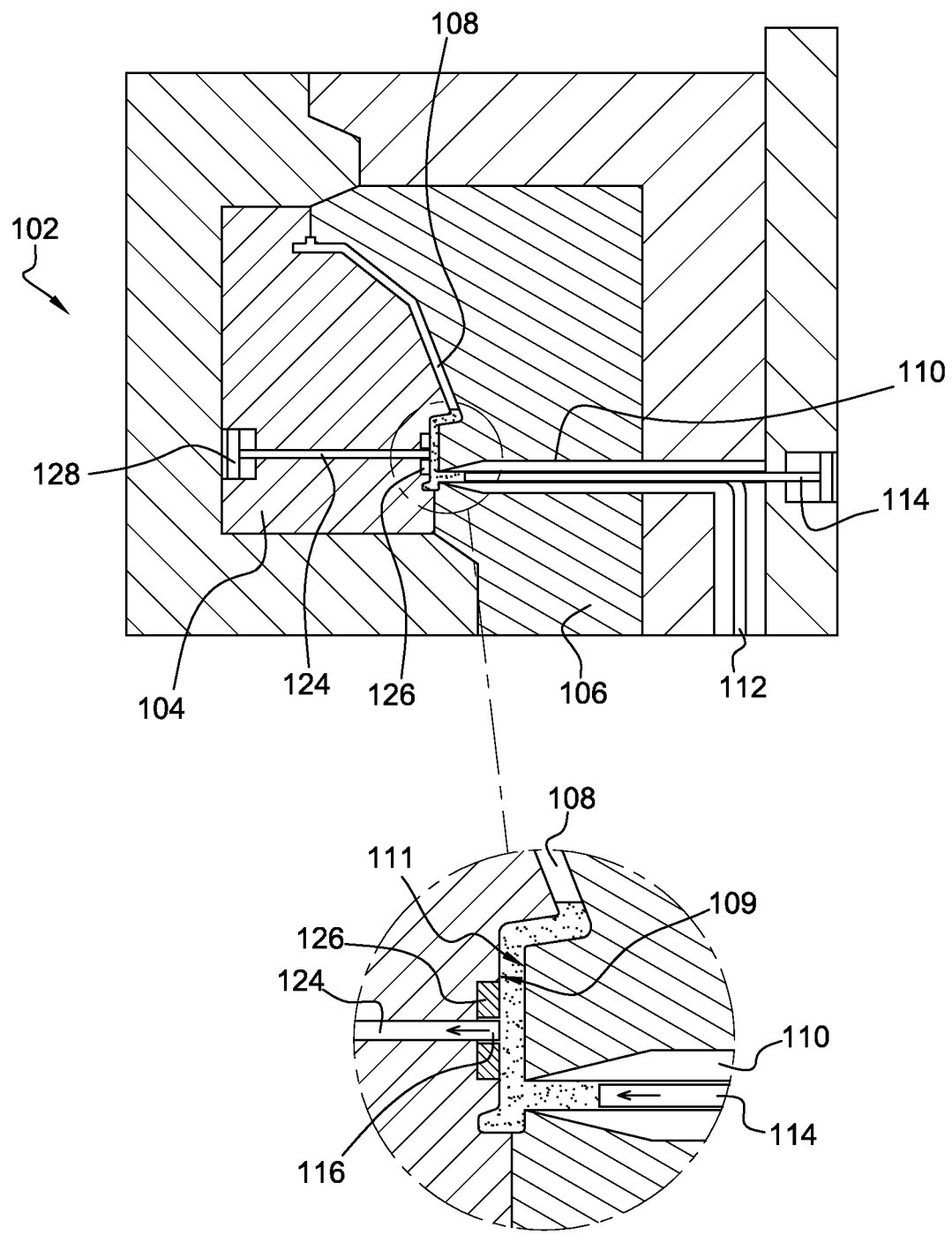
FIG. 3 is a sectional view of a mold of the invention.

The mold 102 shown in section in FIG. 3 essentially comprises two half-molds 104 and 106. These two half-molds 104 and 106 are designed to be disposed and held in contact with each other to form an enclosure 108. This enclosure 108 is designed to be filled with plastic material 118 by injection to form a generally thin part, such as a part for a vehicle lighting and/or signalling device. The enclosure 108 is defined by the corresponding surfaces 109 and 111 of the half-molds 104 and 106.

The right-hand half-mold 106 includes an injection nozzle 110 with a control unit 114 and a plastic material inlet 112. The outlet of this injection nozzle 110 discharges in the vicinity of one end of the part to be formed or in the vicinity of a feed passage of the part.

The left-hand half-mold 104 includes an insert 126 disposed in a corresponding opening. The exterior surface of the insert 126 is flush with the adjoining surface 109 of the left-hand half-mold 104. The insert 126 includes a through-orifice through which is disposed a mobile rod 124. This is adapted to be moved in translation via a driving device 128 of the hydraulic type. The driving device 128 may of course be of another kind such as pneumatic, electrical, etc., well known in itself to the person skilled in the art.

As is clearly visible in the enlarged portion of FIG. 3, the mobile rod 124 in translation initially occupies all or almost all of the volume of a cavity 116 formed by the passage through the insert 126. The volume of the cavity 116 is thus essentially zero at the beginning of the injection operation. It may be modulated in the direction of an increase by progressive movement of the mobile rod 124 during the injection operation. The thickness of the insert 126 is equal to or greater than the maximum travel of the mobile rod 124, i.e. the maximum depth of the cavity 116.

The insert 126 is produced in a material adapted to the plastic material injection temperature conditions and adapted to support and retain the mobile rod 124. It is to be noted that the presence of an insert 126 may not be necessary, depending on of the material chosen for the mold elements including the mobile rod 124. It is entirely conceivable to machine or form the mold element in any way to produce a passage directly in the element in question able to receive the mobile rod 124 and to form the cavity 116.

Figure 4:
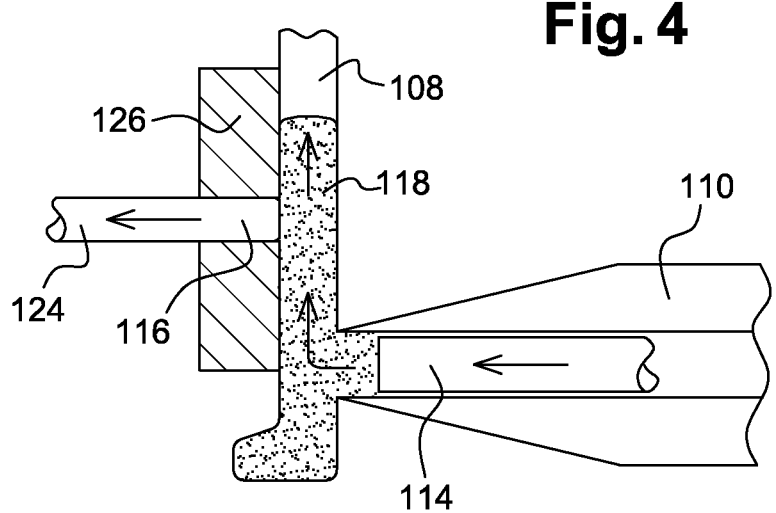
FIG. 4 is a view to a larger scale of the critical part of the volume of the mold from FIG. 3, showing a first step of molding the part.
Figure 5:
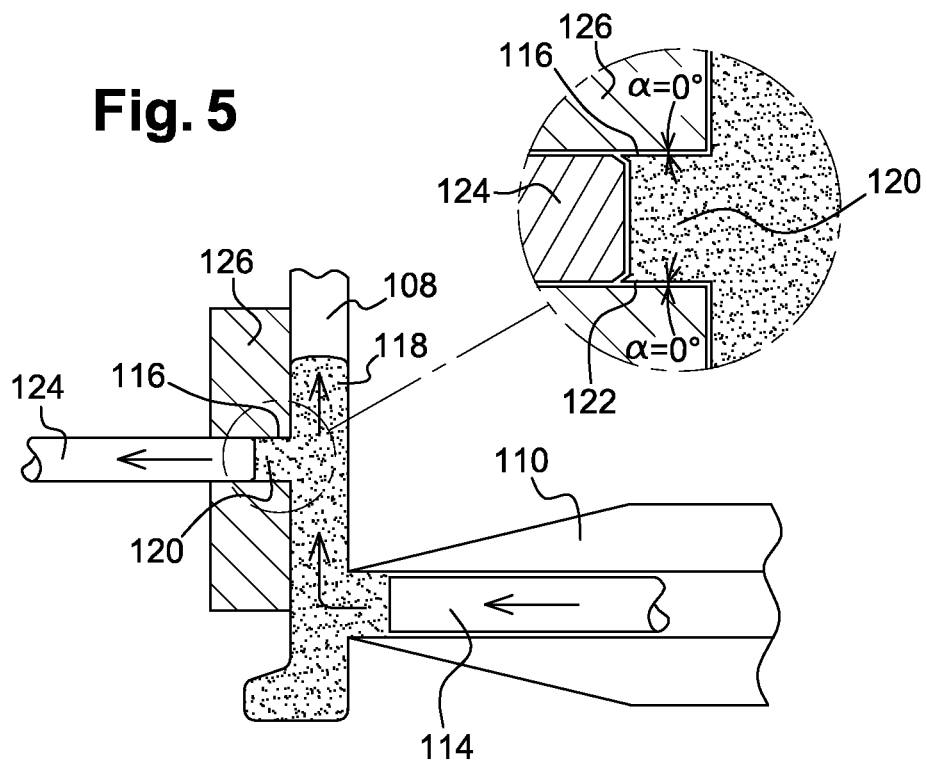
FIG. 5 is a view to a larger scale of the critical portion of the volume of the mold from FIG. 3, similar to FIG. 4 but showing a second step of molding the part.

FIGS. 4 and 5 show in more detail the modulation of the volume of the variable geometry cavity 116 during the injection of the plastic material 118. FIG. 4 illustrates a first step of formation of the part in which the plastic material 118 begins to be injected from the injection nozzle 110 and via the control member 114 moving toward the enclosure 108 to push the plastic material 118 into it. This fills the lower portion of the enclosure 108 up to a level greater than or equal to that of the mobile rod 124. At this stage, the mobile rod 124 is in a position corresponding to a minimum volume of the cavity 116. To be more specific, in the precise situation of FIG. 4, the minimum volume is a zero volume, the end of the mobile rod 124 being flush with the adjoining surface forming the surface of the molding enclosure 108.

In FIG. 5, the level of filling of the enclosure 108 by the plastic material 118 is similar to that in FIG. 4. The mobile rod 124 has begun a movement in translation in a direction corresponding to an increase in the volume of the cavity 116. The plastic material 118 present in front of the cavity 116 has not yet solidified and is not yet under pressure. It may thus progressively fill the variable volume of the cavity 116 without opposition by a volume of air present in the cavity 116. The plastic material 118 can thus freely fill the volume of the cavity 116 as the latter increases. The plastic material 118 may quickly come into contact with the mobile bottom of the cavity 116 as soon as the mobile rod 124 starts to move, thereafter to advance over the whole of its front and fill the volume generated in this way.

As is clearly visible in the enlarged portion of FIG. 5, the plastic material 118 present in the cavity 116 and forming the projecting portion 120 of the part being formed is in continuous contact with the walls of the cavity 116. The angle α formed by the walls of the projecting portion 120 formed in this way with the corresponding walls of the cavity 116 is virtually zero. Moreover, the front or end face of the projecting portion 120 of the part forms at its periphery one or more annular edges 122 of notably circular or non-circular (rectangular, square, trapezoidal, etc.) shape, which correspond to the clearance present between the mobile rod 124 and the corresponding passage of the insert 126 in which the mobile rod 124 is accommodated. This clearance is notably formed, at least at the end of the mobile rod 124, by the beveling or rounding of the front edge of the mobile rod 124.

In the specific case of FIGS. 3 to 5, the projecting portion 120 of the part to be formed has no clearance angle with respect to the cavity 116. On removal from the mold, the mobile rod 124 may be moved in a direction corresponding to a reduction of the volume of the cavity 116 so as to expel said portion 120 from the cavity 116.

The section of the projecting portion 120 of the part to be formed that is shown in FIGS. 3 to 5 is circular, for reasons of simplicity and clarity in the explanation of the invention. In the reality, the projecting portion 120 of the part to be formed could have diverse sections. The principle of occupation of the volume of the cavity 116 is applicable to all kinds of section. Moreover, it is not necessary for the mobile rod 124 or mobile element to occupy the whole of the section of the cavity 116. An occupancy of at least 80%, preferably 90%, more preferably 95% of the section of the cavity 116 may be sufficient to procure the advantageous effects described above.

Again for reasons of simplicity and clarity in the explanation of the invention, the cavity 116 shown in FIGS. 3 to 5 has been intentionally arranged perpendicular to the main direction of flow of plastic material 118. In practice, the cavity 116 could have geometries other than that shown, notably with angles of inclination relative to the main plastic material flow direction other than 90° C.

It is also to be noted that the part to be formed may include a plurality of projecting portions like that shown in FIGS. 3 to 5. The mold may thus include a plurality of variable volume cavity devices like that described.

The advantages of the invention described above are particularly beneficial for projecting portions of small section. In the case of cavities of small section, as a function of the rheological conditions of injection of the plastic material, the latter could rapidly cover the inlet of the cavity and prevent the evacuation of air present in the far end of the cavity and/or see its flow perturbed by the change of thickness. The volume of the projecting portion preferably forms less than 10%, more preferably 5%, even more preferably 1% of the total volume of the part.

The volume of the projecting portion 120 may be of the order of a few mm$^3$, for example 5 to 50 mm$^3$ for a total volume of the molded part of the order of a few hundred cm$^3$, for example from 100 to 800 cm$^3$.

The volume of the cavity may be modulated in various ways. The increase in the volume of the cavity may start as soon as the plastic material reaches the inlet of the cavity. It may equally start later, when a certain length or column of material is present downstream of the cavity, so that the plastic material facing the cavity has a certain level of pressure. Moreover, the rate of modulation of the volume of the cavity may depend on various factors such as notably the rate of solidification of the plastic material.

The invention that has just been described with reference to the injection of plastic material 118 is applicable to the injection of all plastic materials and elastomers as well as various metals and alloys with a relatively low melting point such as alloys of aluminum, zinc (Zamak), brass or alloys of magnesium transformed in particular by a thixomolding process.

While the system and apparatus herein described constitute preferred embodiments of this invention, it is to be understood that the invention is not limited to this precise system and apparatus, and that changes may be made therein without departing from the scope of the invention which is defined in the appended claims.

What is claimed is:

1. A molding method for molding a part by plastic injection, comprising the following steps:
   a) making available a mold forming an enclosure corresponding to the shape of said part to be formed, said enclosure including a cavity designed to form a first projecting portion of said part;
   b) injection of a plastic material into said enclosure of said mold, said mold having a first recess area upstream of where said plastic material is injected into said enclosure for receiving at least some of said plastic material to form a first projection portion in the part;

c) modulation of a volume of said cavity in the direction of an increase in said volume during the step b); and d) performing said modulation step by driving a mobile element in communication with said cavity away from said enclosure using a driving device in order to cause said increase in said volume in said cavity as said plastic material is injected into said cavity during said injection step;

wherein said cavity is arranged substantially perpendicular of a main direction of flow of said plastic material and downstream of where said plastic is injected into said enclosure; and said cavity receiving said plastic material and causing a second projection portion to be provided in said part, wherein said first projection portion and said second projection portion are substantially the same size.

2. The molding method according to claim 1, wherein said modulation in said step c) consists in increasing said volume of said cavity when a level of said plastic material has reached an inlet of said cavity.

3. The molding method according to claim 2, wherein said modulation in said step c) takes place when said plastic material present in and/or in front of said inlet of said cavity has not yet solidified.

4. The molding method according to claim 1, wherein said modulation in said step c) starts from a volume of said cavity less than 20% of a final volume of said cavity.

5. The molding method according to claim 1, wherein said mold comprises at least two mold elements designed to cooperate with each other to form an enclosure corresponding to a shape of said part to be formed and designed to receive said plastic material in a main flow direction.

6. The molding method according to claim 1, wherein said molded part is a vehicle lighting and/or signalling device element and said projecting portion formed by said cavity is a stud.

7. The molding method according to claim 1, wherein said projecting portion of said part has a volume less than or equal to 15% of a total volume of said part.

8. The molding method according to claim 1, wherein said method uses a mold element for molding parts by injection of a plastic material, comprising:

a surface designed to receive said plastic material and to form said part, said surface including a cavity adapted to form a projecting portion of said part;

said mold element includes a mobile element in translation in said cavity, said mobile element being adapted to modulate the volume of said cavity during said molding of said part.

9. The molding method according to claim 8, wherein said mobile element is configured so that it may be disposed with its terminal exterior surface at a level of an opening of said cavity, notably flush with said opening.

10. The molding method according to claim 8, wherein said cavity is of generally elongate shape in a longitudinal direction, said mobile element being mobile in the longitudinal direction and preferably occupying a greater part, preferably at least 80%, more preferably at least 90% of a section of said cavity.

11. The molding method according to claim 8, wherein said mold comprises at least two mold elements designed to cooperate with each other to form an enclosure corresponding to a shape of said part to be formed and designed to receive said plastic material in a main flow direction.

12. The mold according to claim 11, wherein said cavity is disposed generally transversely to a main direction of flow of said plastic material during fabrication of said part by injection.

13. The mold according to claim 11, wherein said part has a generally thin shape, preferably having a substantially layer shape, said projecting portion formed by said cavity projecting from the thin part, notably from a main face of said part.

14. The mold according to claim 11, wherein it includes a passage for feeding said plastic material into a molding cavity, said molding cavity being disposed downstream of said passage in the direction of flow of said plastic material during molding.

15. The molding method according to claim 1, wherein said projecting portion of said part has a volume less than or equal to 10% of a total volume of said part.

16. The molding method according to claim 1, wherein said projecting portion of said part has a volume less than or equal to 5% of a total volume of said part.

17. The molding method according to claim 1, wherein said modulation in said step c) starts from a volume of said cavity less than 10% of a final volume of said cavity.

18. The molding method according to claim 1, wherein said modulation in said step c) starts from a volume of said cavity less than 5% of a final volume of said cavity.

* * * * *